(12) United States Patent
Okazaki

(10) Patent No.: US 11,502,580 B2
(45) Date of Patent: Nov. 15, 2022

(54) LINEAR ACTUATOR WITH IMPROVED HEAT TRANSFER PATH

(71) Applicant: CANON KABUSHIKI KAISHA, Tokyo (JP)

(72) Inventor: Ryota Okazaki, Yamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 17/006,488

(22) Filed: Aug. 28, 2020

(65) Prior Publication Data

US 2021/0067007 A1 Mar. 4, 2021

(30) Foreign Application Priority Data

Sep. 4, 2019 (JP) .............................. JP2019-161316

(51) Int. Cl.
*H02K 9/22* (2006.01)
*B65G 54/02* (2006.01)
*H02K 41/03* (2006.01)

(52) U.S. Cl.
CPC ............... *H02K 9/22* (2013.01); *B65G 54/02* (2013.01); *H02K 41/031* (2013.01)

(58) Field of Classification Search
CPC .......... H02K 9/22; H02K 9/223; H02K 9/227; H02K 41/031; H02K 41/0356; B65G 54/02
USPC ................................ 310/12.18, 12.29, 64, 65
See application file for complete search history.

(56) References Cited

U.S. PATENT DOCUMENTS

| 4,749,921 A * | 6/1988 | Chitayat | H02K 41/031 318/135 |
| 6,226,073 B1 * | 5/2001 | Emoto | G03F 7/70716 378/34 |
| 2003/0230941 A1 * | 12/2003 | Jacobs | B65G 47/841 310/12.19 |
| 2015/0091393 A1 * | 4/2015 | Hayner | H02K 9/22 310/12.29 |

FOREIGN PATENT DOCUMENTS

| JP | H11-113238 A | 4/1999 |
| JP | 2018-78668 A | 5/2018 |
| JP | 2018078668 A * | 5/2018 |

OTHER PUBLICATIONS

Machine translation of JP-2018078668-A. (Year: 2018).*

* cited by examiner

*Primary Examiner* — Michael Andrews
(74) *Attorney, Agent, or Firm* — Canon U.S.A., Inc., IP Division

(57) ABSTRACT

A linear actuator includes a guide rail, a wall portion, a coil, a heat transfer member, a heat radiation member, and a heat insulation member. A mover having a permanent magnet is movable along the guide rail. The wall portion is installed on a pedestal and supports the guide rail. The heat transfer member is coupled to the coil and the heat radiation member is coupled to an end of the heat transfer member. The heat insulation member is installed on the pedestal and coupled to the heat radiation member. The heat transfer member is arranged apart from the wall portion.

15 Claims, 6 Drawing Sheets

LINEAR ACTUATOR WITH IMPROVED HEAT TRANSFER PATH

BACKGROUND

Field

The present disclosure relates to a linear actuator.

Description of the Related Art

Japanese Patent Application Laid-Open No. H11-113238 discloses a movable magnet type linear actuator having a mover with a permanent magnet unit and a stator with an armature unit. In Japanese Patent Application Laid-Open No. H11-113238, since the armature units are arranged so as to hold the permanent magnet unit, suction force that works between an excitation core of the armature unit and a permanent magnet of the permanent magnet unit is cancelled. Thereby, it is possible to suppress deformation of the stator frame due to the suction force.

In Japanese Patent Application Laid-Open No. H11-113238, however, an increase in speed and an increase in density of the mover causes an increase in the amount of heat generation of a coil, and the heat from the coil is transferred to the frame to which the coil is fixed. Since deflection is caused on the frame due to thermal expansion of the frame, stop position accuracy of the mover, which moves along a guide rail on the frame, is reduced. Further, since the position of a position detector is shifted due to the thermal expansion of the frame, detection accuracy for the position of the mover is also reduced.

Accordingly, Japanese Patent Application Laid-Open No. 2018-78668 discloses a structure of a linear actuator that prevents the heat generation of the coil unit from transferring to the frame. In the structure disclosed in Japanese Patent Application Laid-Open No. 2018-78668, a heat insulation member is provided between a coil unit and a frame, and a heat transfer member having one end coupled to the coil unit and the other end coupled to a heat radiation portion is provided.

In the structure disclosed in Japanese Patent Application Laid-Open No. 2018-78668, however, high heat insulation performance is required for the heat insulation member provided between the coil unit and the frame, and high heat transfer performance is also required for the heat transfer member provided between the coil unit and the heat radiation portion. Therefore, since rigidity of a coil attachment portion is reduced due to a heat insulation member having high thermal resistance and a large space is required to obtain high heat insulation performance of the heat insulation member, the size of the apparatus is increased.

Furthermore, to increase heat insulation performance of the heat insulation member and heat transfer performance of the heat transfer member, a special material is required to be used, respectively, which increases the cost of the apparatus. Thus, even when the structure in Japanese Patent Application Laid-Open No. 2018-78668 is employed to the linear actuator, it is difficult to completely prevent the heat generation of the coil unit from being transferred to the frame, and as a result, the frame is thermally expanded. Thermal expansion of the frame contributes to a reduction in positioning accuracy of the mover.

SUMMARY

According to an aspect of the present disclosure, a linear actuator includes a guide rail along which a mover having a permanent magnet is movable, a wall portion installed on a pedestal and supporting the guide rail, a coil, a heat transfer member coupled to the coil, a heat radiation member coupled to an end of the heat transfer member, and a heat insulation member installed on the pedestal and coupled to the heat radiation member, wherein the heat transfer member is arranged apart from the wall portion.

Further features of the present disclosure will become apparent from the following description of exemplary embodiments with reference to the attached drawings.

DESCRIPTION OF THE EMBODIMENTS

A processing system according to one embodiment of the present disclosure will be described with reference to FIG. 1 to FIG. 5. Note that, for a plurality of the same components in the descriptions and drawings described below, when a distinction is required, a lowercase alphabet is added at the end of the same numerical reference as an identifier, and when a distinction is not particularly required, the identifier is omitted and only the numerical reference is used.

Figure 1:
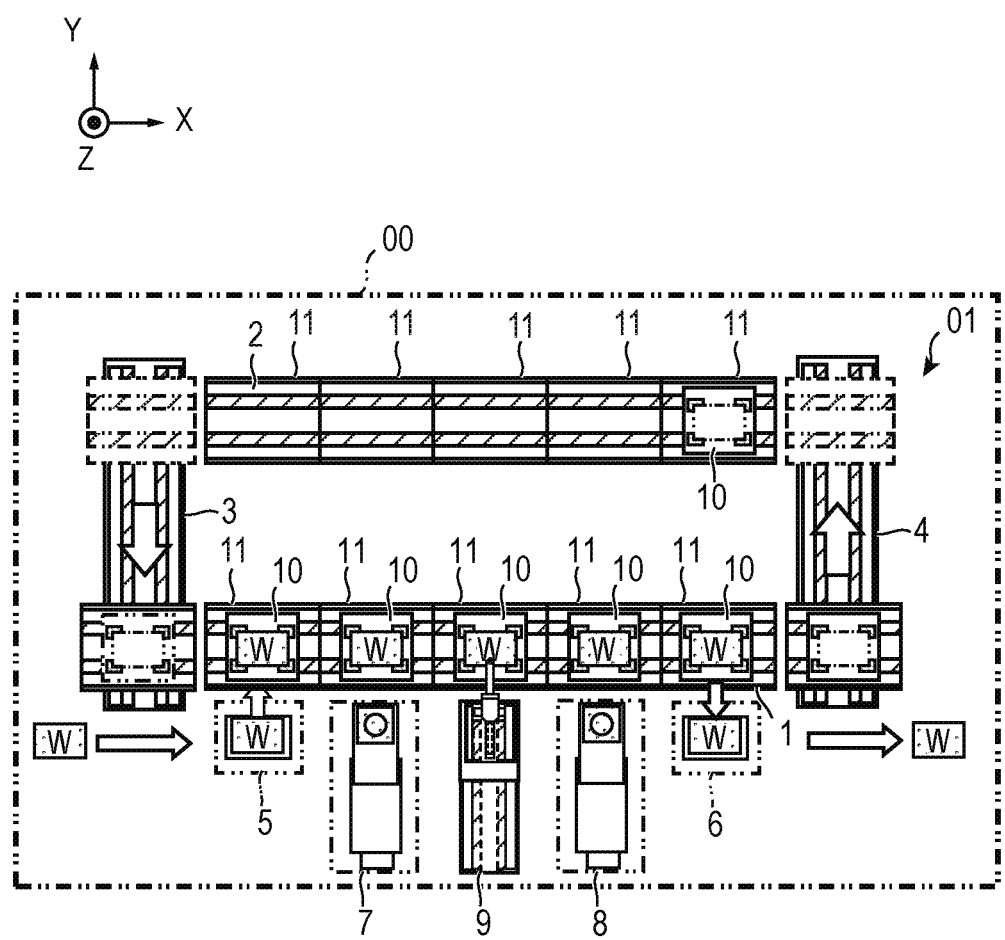
FIG. 1 is a schematic diagram illustrating the overall configuration of a processing system according to one embodiment of the present disclosure.

First, the overall configuration of the processing system according to the present embodiment will be described with reference to FIG. 1. FIG. 1 is a schematic diagram illustrating the overall configuration of the processing system according to the present embodiment and schematically illustrates the overall system when viewed from the top face.

A product having a complex shape and structure such as a camera and a printer cartridge is often assembled on a production line by continuous work. Adjacent assembling apparatuses on the production line are connected to each other via a transport apparatus. A workpiece that is an assembling target is sequentially transferred to each assembling apparatus by the transport apparatus and continuously processed. When high assembling accuracy of several μm to several tens of μm is required, the workpiece transported by the transport apparatus is positioned by a positioning apparatus. Thereby, the assembling apparatus can perform assembly with desired accuracy.

As a drive source of the transport apparatus, a movable magnet type linear actuator may include a magnet on the mover side and a coil on the stator side. The movable magnet type linear actuator has a plurality of coils aligned along a traveling track of the mover. A movable magnet type linear motor can magnetically drive a mover by appropriately conducting drive current to the plurality of coils and perform a transport for a long length. As the traveling track of the mover, for example, a ball circulation type slider and a guide rail are used. The mover can linearly move or curvilinearly move along the guide rail with high accuracy.

Compared to a ball screw type transport apparatus, since no backlash occurs, the linear actuator has high positioning accuracy and a high repeatability reproducibility. Therefore, linear motors are used in high-speed transport apparatuses for the manufacturing lines for precision instruments.

The processing system according to the present embodiment uses a linear actuator as a drive source of the transport apparatus for transporting a workpiece. As illustrated in FIG. 1, a processing system 00 according to the present embodiment has a transport apparatus forward path 1, a transport apparatus reverse path 2, a carriage transfer apparatus 3, a carriage transfer apparatus 4, a workpiece input apparatus 5, and a workpiece output apparatus 6. The processing system 00 further has a preprocessing inspection apparatus 7, a post-processing inspection apparatus 8, a processing apparatus 9, and a transport carriage 10. The processing system 00 according to the present embodiment transports a workpiece W that is a processing target to be processed and also includes a transport system 01 that positions the workpiece W on the transport carriage 10. The processing system 00 can perform a manufacturing method of processing the workpiece W to manufacture an article.

The transport system 01 has the transport apparatus forward path 1, the transport apparatus reverse path 2, the carriage transfer apparatus 3, and the carriage transfer apparatus 4 that are stators. The transport apparatus forward path 1, the transport apparatus reverse path 2, the carriage transfer apparatus 3, and the carriage transfer apparatus 4 form a transport path for the transport carriage 10 that is a mover. In the present embodiment, the transport carriage 10 may be referred to as a mover, and the transport path for the transport carriage 10 may be referred to as a stator.

Here, each coordinate axis and direction of the X-axis, the Y-axis, and the Z-axis of the XYZ coordinate system that is the orthogonal coordinate system used in the description below are defined. First, the X-axis is taken along a transport direction of the horizontally transported transport carriage 10. Further, an axis perpendicular to a horizontally-placed pedestal 02 described below, that is, an axis along the vertical direction is defined as the Z-axis, and an axis orthogonal to the X-axis and the Z-axis is defined as the Y-axis. In the XYZ coordinate system in which the coordinate axes are defined in a such way, a direction along the X-axis is defined as the X direction, and in the X direction, the same direction as the transport direction of the transport carriage 10 is defined as the +X direction, and the opposite direction to the +X direction is defined as the −X direction. Further, a direction along the Y-axis is defined as the Y direction, and in the Y direction, a direction from the right side to the left side with respect to the +X direction is defined as the +Y direction, and the opposite direction to the +Y direction is defined as the −Y direction. Further, a direction along the Z-axis is defined as the Z direction, and in the Z direction, a direction from the transport path side to the transport carriage 10 side, that is, a vertically upward direction is defined as the +Z direction, and a direction from the transport carriage 10 side to the transport path side, that is, a vertically downward direction is defined as the −Z direction.

In the processing system 00, the transport apparatus forward path 1 and the transport apparatus reverse path 2 each forming a linear transport path used for transporting the transport carriage 10 are installed in parallel to each other. The transport carriage 10 that is a carriage is transported along the transport apparatus forward path 1 and the transport apparatus reverse path 2. The carriage transfer apparatus 3 is installed in the uppermost stream of the transport apparatus forward path 1. Further, the carriage transfer apparatus 4 is installed in the downmost stream of the transport apparatus forward path 1. The transport carriage 10 transported along the transport apparatus forward path 1 is transferred to the transport apparatus reverse path 2 by the carriage transfer apparatus 4. Further, the transport carriage 10 transported along the transport apparatus reverse path 2 is transferred to the transport apparatus forward path 1 by the carriage transfer apparatus 3. That is, the transport carriage 10 is transported and circulated along the transport apparatus forward path 1 and the transport apparatus reverse path 2. Note that only one transport carriage 10 may be installed, or a plurality of transport carriages 10 may be installed.

The transport apparatus forward path 1 and the transport apparatus reverse path 2 are modularized and have a plurality of transport modules 11.

The workpiece input apparatus 5 that is a workpiece supply apparatus used for supplying and mounting the workpiece W to the transport carriage 10 is installed upstream the transport apparatus forward path 1. The workpiece output apparatus 6 used for unloading and outputting the workpiece W from the transport carriage 10 is installed downstream the transport apparatus forward path 1.

Between the workpiece input apparatus 5 and the workpiece output apparatus 6, the preprocessing inspection apparatus 7, the processing apparatus 9, and the post-processing inspection apparatus 8 are installed in this order in the direction from the workpiece input apparatus 5 side to the workpiece output apparatus 6 side. The preprocessing inspection apparatus 7 is an apparatus for detecting the position of the workpiece W on the transport carriage 10 before processing by the processing apparatus 9. The processing apparatus 9 is an apparatus for performing processing such as application, bonding, assembly operation, or the like based on a result of position detection by the preprocessing inspection apparatus 7. The post-processing inspection apparatus 8 is an apparatus for inspecting whether or not predetermined processing has been performed after performing processing. Note that there is a case where only one processing apparatus 9 is installed or a case where a plurality of processing apparatuses 9 are installed. There is a case where the plurality of processing apparatuses 9 are installed at constant intervals or a case where the plurality of processing apparatuses 9 are installed at any intervals.

The processing apparatus 9 is not particularly limited, and a processing apparatus that performs various processing operations on the workpiece W may be used.

The transport carriage 10, which is the mover, is a carriage sequentially transported through the workpiece input apparatus 5, the preprocessing inspection apparatus 7, the processing apparatus 9, the post-processing inspection apparatus 8, and the workpiece output apparatus 6, which are installed to the transport apparatus forward path 1 at predetermined intervals. The workpiece W is supplied and input to the transport carriage 10 by the workpiece input apparatus 5. Next, after the workpiece W on the transport carriage 10 have been positioned and fixed, a predetermined processing operation is performed on the workpiece W on the transport carriage 10 by the processing apparatus 9 based on a result of position detection of the workpiece W by the preprocessing inspection apparatus 7. After completion of all the processing operations by the processing apparatus 9, inspection by the post-processing inspection apparatus 8 is performed, the workpiece W is unloaded from the transport carriage 10 by the workpiece output apparatus 6, and an article formed by processing the workpiece W is manufactured.

Next, the outline of the configuration of the transport apparatus forward path 1, the transport apparatus reverse path 2, the carriage transfer apparatuses 3 and 4, and the transport carriage 10 in the transport system 01 will be further described with reference to FIG. 2 to FIG. 4.

Figure 2:
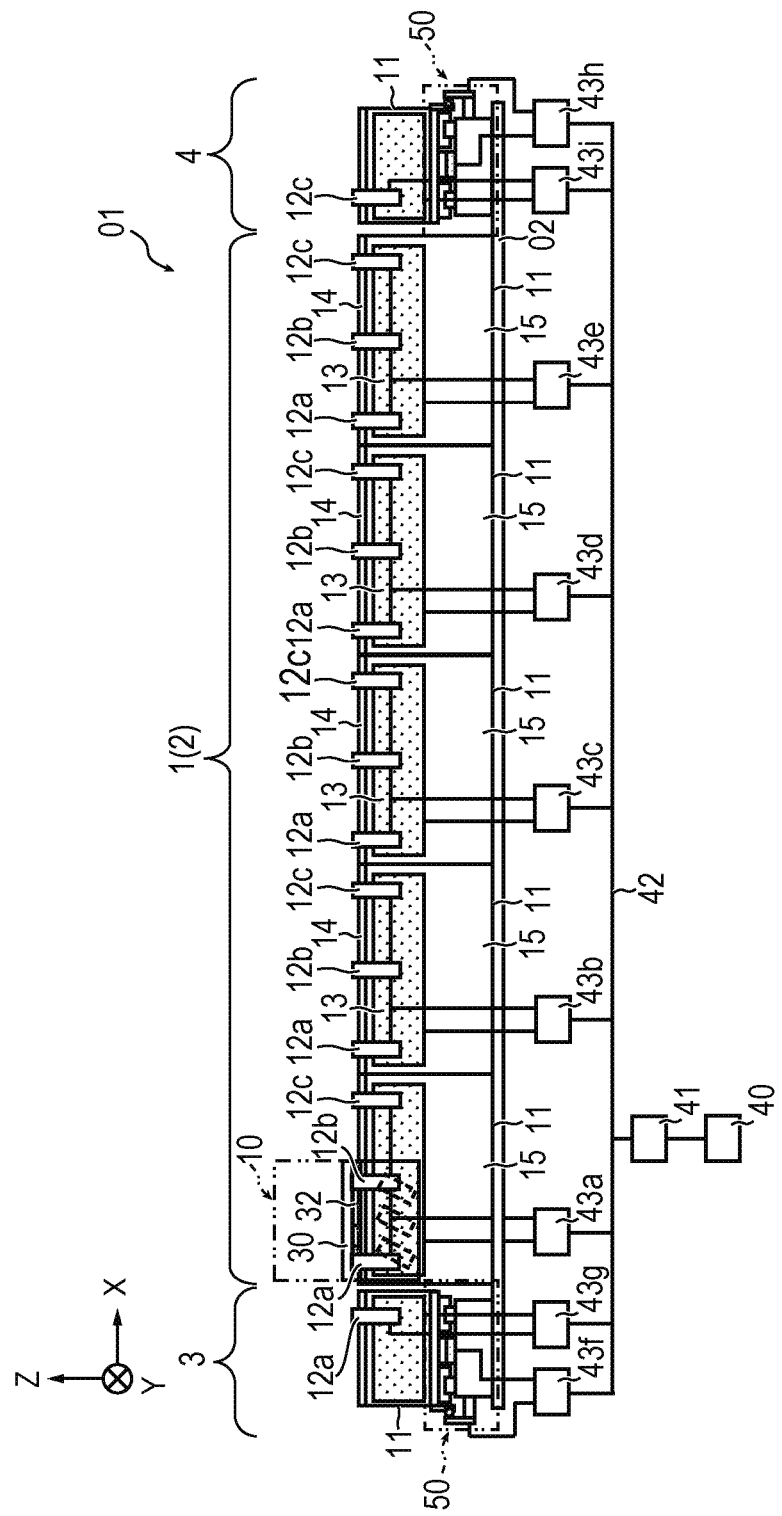
FIG. 2 is a schematic diagram illustrating a configuration of a transport system according to one embodiment of the present disclosure.

FIG. 2 is a diagram of the transport apparatus forward path 1 when viewed from the Y direction. FIG. 3 is a diagram of the transport carriage 10 and the transport module 11 that is a portion of the transport path when viewed from the Y direction. FIG. 4 is a sectional view illustrating the configuration of the transport carriage 10 and the transport module 11 and illustrates a cross section perpendicular to the X direction of the transport carriage 10 and the transport module 11.

The processing system 00 has a plurality of lower-level controllers 43 communicably connected to a plurality of transport modules 11, the carriage transfer apparatus 3, and the carriage transfer apparatus 4, respectively. Each of the lower-level controller 43 controls the transport module 11 or the carriage transfer apparatus 3 or 4 to be connected.

Note that, for simplified illustration, FIG. 2 illustrates five transport modules 11 and five lower-level controllers 43*a*, 43*b*, 43*c*, 43*d*, and 43*e* as the lower-level controllers connected to each of the transport modules 11. Further, the lower-level controllers 43*f* and 43*g* are illustrated as the lower-level controllers 43 connected to the carriage transfer apparatus 3. Further, the lower-level controllers 43*h* and 43*i* are illustrated as the lower-level controllers 43 connected to the carriage transfer apparatus 4. In the description, the lower-level controller is denoted as "lower-level controller 43" as long as they are not required to be distinguished in particular. A plurality of lower-level controllers 43 are connected to a lower-level controller network 42.

The processing system 00 further has a middle-level controller 41 and an upper-level controller 40. The middle-level controller 41 is communicably connected to the plurality of lower-level controllers 43 via the lower-level controller network 42. The middle-level controller 41 controls the plurality of lower-level controllers 43. Further, the upper-level controller 40 that transmits an operation instruction to the middle-level controller 41 is connected to the middle-level controller 41.

As illustrated in FIG. 2, the transport module 11 is installed on a horizontal installation face of the pedestal 02. The transport module 11 has a transport module casing 15, encoders 12*a*, 12*b*, and 12*c*, a group of coils 13 (a plurality of carriage drive coils) for driving the carriage, and a guide rail 14. Further, a power source (not illustrated) is connected to the lower-level controller 43. The group of coils 13 are attached to a carriage drive coil bracket 19 in the transport module casing 15 along the X direction (see FIG. 3 and FIG. 4). The guide rail 14 is attached on the transport module casing 15 along the X direction and allows the transport carriage 10 to move thereon. The transport module casing 15 extends along the guide rail 14 to support the guide rail 14.

As described below, the transport carriage 10 has a transport carriage base 30, a scale 32, and a guide block 35 (see FIG. 3 and FIG. 4).

The lower-level controller 43 can calculate the position of the transport carriage 10 on the transport module 11 based on the output of the connected encoder 12 and the position of installation of the connected encoder 12. In accordance with the calculated position of the transport carriage 10 or the like, the lower-level controller 43 can control a current amount applied to the carriage drive coil 13. Thereby, the lower-level controller 43 can transport the transport carriage 10 to a predetermined position at a predetermined speed and stop the transport carriage 10 there.

Further, the lower-level controller 43 can detect by the encoder 12 that the transport carriage 10 enters the transport module 11 to be connected from the adjacent transport module 11. The lower-level controller 43 controls the transport carriage 10 inside the transport module 11 to be connected in order to transport the transport carriage 10, which has entered the transport module 11 to be connected, to a predetermined position at a predetermined speed and stop the transport carriage 10.

The lower-level controller 43 has a communication function for exchanging information with the middle-level controller 41. The lower-level controller 43 communicates with the middle-level controller 41 for position information or the like of the transport carriage 10 detected by the encoder 12 held by its own lower-level controller 43.

The middle-level controller 41 can transmit an instruction for operating the transport carriage 10 to each of the lower-level controllers 43. Thereby, the middle-level controller 41 can control a plurality of transport carriages 10.

Note that the transport apparatus reverse path 2 has the same configuration as the transport apparatus forward path 1 described above except for being configured so that the transport direction of the transport carriage 10 is opposite to the transport direction in the transport apparatus forward path 1.

Subsequently, the configuration of the carriage transfer apparatus 3 and the carriage transfer apparatus 4 will be described. As illustrated in FIG. 2, each of the carriage transfer apparatus 3 and the carriage transfer apparatus 4 has a carriage transfer actuator 50 operable in the Y direction and a module that is mounted on a carriage transfer actuator 50 and has the same configuration as the transport module 11.

While, in the present embodiment, the configurations of the carriage transfer apparatus 3 and the carriage transfer apparatus 4 will be described with reference to the same configuration as the transport module 11, the configurations of the carriage transfer apparatus 3 and the carriage transfer apparatus 4 are not limited thereto. It is also possible to transfer the transport carriage 10 between the transport apparatus forward path 1 and the transport apparatus reverse path 2 by using a different configuration.

The lower-level controller 43*f* connected to the carriage transfer apparatus 3 controls the carriage transfer actuator 50 of the carriage transfer apparatus 3. In the same manner as the lower-level controllers 43*a*, 43*b*, 43*c*, 43*d*, and 43*e*, the lower-level controller 43*g* connected to the carriage transfer apparatus 3 controls a module having the same configuration as the transport module 11 of the carriage transfer apparatus 3. Further, the lower-level controller 43*h* connected to the carriage transfer apparatus 4 controls the carriage transfer actuator 50 of the carriage transfer apparatus 4. In the same manner as the lower-level controllers 43*a*, 43*b*, 43*c*, 43*d*, and 43*e*, the lower-level controller 43*i* connected to the carriage transfer apparatus 4 controls a module having the same configuration as the transport module 11 of the carriage transfer apparatus 4.

The carriage transfer apparatus 3 and the carriage transfer apparatus 4 transfer the transport carriage 10 by moving between the transport apparatus forward path 1 and the transport apparatus reverse path 2, respectively. The carriage transfer apparatus 4 transfers the transport carriage 10 transported along the transport apparatus forward path 1 from the transport apparatus forward path 1 to the transport apparatus reverse path 2. The carriage transfer apparatus 3 transfers the transport carriage 10 transported along the transport apparatus reverse path 2 from the transport apparatus reverse path 2 to the transport apparatus forward path 1.

The upper-level controller 40 controls the overall processing system 00, and in addition to the middle-level controller 41, controllers (not illustrated) each for each apparatus that controls the workpiece input apparatus 5, the workpiece output apparatus 6, the preprocessing inspection apparatus 7, the post-processing inspection apparatus 8, and the processing apparatus 9, and the like are communicably connected to the upper-level controller 40. The upper-level controller 40 controls the operation and order of operations of each apparatus in the processing system 00.

Next, the configuration of the transport carriage 10 and the transport module 11 will be described with reference to FIG. 3 and FIG. 4.

Figure 3:
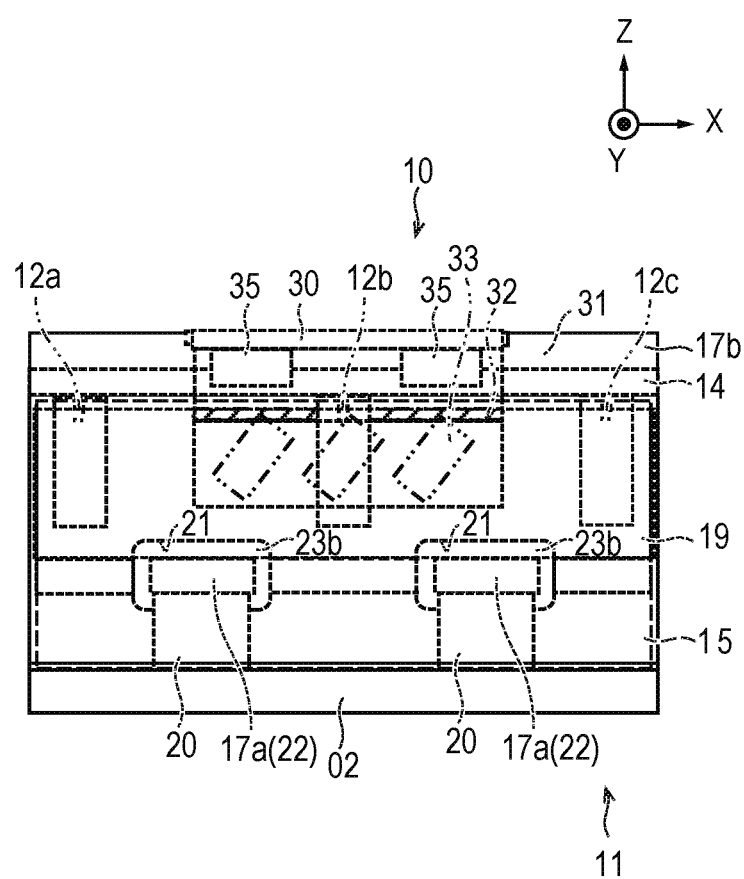
FIG. 3 is a schematic diagram illustrating a configuration of a transport carriage and a transport module in the transport system according to one embodiment of the present disclosure.
Figure 4:
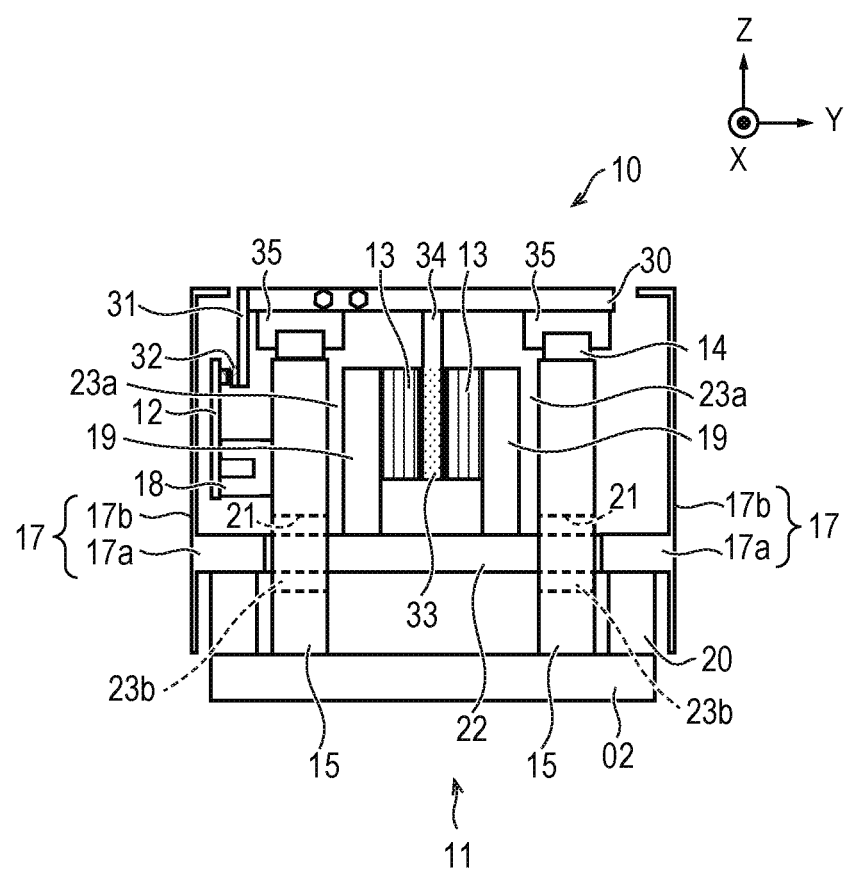
FIG. 4 is a sectional view illustrating the configuration of the transport carriage and the transport module in the transport system according to one embodiment of the present disclosure.

As illustrated in FIG. 3 and FIG. 4, the transport module 11 that is a portion of the transport path, which is a stator, has the transport module casings 15, the encoders 12a, 12b, and 12c, the carriage drive coils 13, the guide rail 14, and an encoder bracket 18. The transport module 11 further has heat radiation portions 17, carriage drive coil brackets 19, a heat insulation member 20, and a heat transfer coil bracket 22.

The transport carriage 10 that is a mover has a transport carriage base 30, a scale bracket 31, the scale 32, a permanent magnet 33, a permanent magnet bracket 34, and the guide block 35.

The transport module 11 has recess structure having an open top formed of the pedestal 02 and the two plate-like transport module casings 15. The two plate-like transport module casings 15 are wall portions installed on the pedestal 02 such that the inner walls face each other in the Y direction.

The two plate-like carriage drive coil brackets 19 are arranged between the two inner walls of the transport module casings 15 such that the inner walls face each other in the Y direction. On the two inner walls of the carriage drive coil brackets 19, a pair of the carriage drive coils 13 is installed so as to face each other. The pair of the carriage drive coils 13 is formed such that the permanent magnet 33 and the permanent magnet bracket 34 installed on the transport carriage 10 pass between the carriage drive coils 13.

In the transport carriage 10, the top face of the transport carriage base 30 is a face on which the workpiece W is mounted. On the top face of the transport carriage base 30, a mechanism that performs positioning, fixing, or the like of the workpiece W may be installed. On the other hand, the guide blocks 35 and the permanent magnet bracket 34 are installed on the bottom face of the transport carriage base 30. The guide block 35 is installed at each end of the bottom face of the transport carriage base 30 along the X direction. The permanent magnet bracket 34 is installed at the center of the bottom face of the transport carriage base 30 along the X direction. The transport carriage 10 having the transport carriage base 30 and the permanent magnet bracket 34 has a T-shaped cross section structure when viewed from the X direction. A plurality of permanent magnets 33 are installed so as to be embedded in the permanent magnet bracket 34. The plurality of permanent magnets 33 are installed in the permanent magnet bracket 34 so as to align in the X direction. Note that, in the present specification, the permanent magnet bracket 34 and the permanent magnet 33 may be collectively referred to as a permanent magnet.

A current is applied to the carriage drive coil 13 in the transport module 11 under the control by the lower-level controller 43. Thereby, electromagnetic force for driving the transport carriage 10 is generated between the plurality of permanent magnets 33 attached to the transport carriage base 30 and the carriage drive coils 13 attached to the carriage drive coil brackets 19. The transport carriage 10 is driven by the electromagnetic force generated between the plurality of permanent magnets 33 and the carriage drive coils 13 and transported on the transport module 11 along the X direction. That is, the transport carriage 10 is transported on the transport apparatus forward path 1 in the +X direction and transported on the transport apparatus reverse path 2 in the –X direction. As described above, in the present embodiment, the transport system 01 by a moving magnet (MM) type linear actuator in which the carriage drive coil 13 does not move and the permanent magnet 33 moves is formed.

In the transport carriage 10, the scale 32 is attached to the side face along the X direction of the transport carriage base 30 via the scale bracket 31 at a position that allows position detection performed by the encoder 12. That is, the scale 32 is attached so as to face the encoder 12. The scale 32 has a pattern used for position detection of the transport carriage 10. Note that the scale 32 may be directly attached to the side face of the transport carriage base 30 without interposing the scale bracket 31. In the present specification, the scale bracket 31 and the scale 32 may be collectively referred to as a scale.

On the other hand, in the transport module 11, the encoder 12 is installed on one side face of the outer sides of the transport module casings 15 via an encoder bracket (sensor attachment member) 18. The encoder 12 is adjusted by the encoder bracket 18 such that a detection unit that is a scale reading unit of the encoder 12 is arranged so as to face the scale 32. Note that, although an example where the three encoders 12 are installed is illustrated in the present embodiment, the number of the encoders 12 is not limited thereto. The transport module 11 may have at least one or more encoders 12. The number of the encoders 12 may be set in accordance with the size of the transport carriage 10, the transport module 11, or the like, for example. Further, the encoder 12 may be directly attached to the side face of the transport module casing 15 without interposing the encoder bracket 18. In the present specification, the encoder bracket 18 and the encoder 12 may be collectively referred to as an encoder. Further, although in the present embodiment, a form in which the position of the mover is detected by using the encoder and the scale as the position detection unit will be described, the form is not limited thereto. A position detection sensor that can detect the position of the mover with respect to the stator may be used as the position detection unit. In the present specification, a member attached to the mover is referred to as a scale, and a member attached to the stator is referred to as an encoder or a sensor.

It is preferable that a spacing between the encoder 12a and the encoder 12b and a spacing between the encoder 12b and the encoder 12c be shorter than the length of the scale 32 attached to the transport carriage 10, respectively. Accordingly, the position of the transport carriage 10 can be detected by any of the encoder 12a, 12b, and 12c at any position on the transport module 11.

The encoder 12 in the transport module 11 is attached to the transport module casing 15 such that the gap between the scale 32 attached to the transport carriage 10 and the encoder 12 is constant. The encoder 12 can detect the position of the transport carriage 10 in the X direction as a relative position from the encoder 12 by reading the pattern of the scale 32.

Each of the carriage drive coil brackets 19 is installed on the heat transfer coil bracket 22 arranged under the carriage drive coil bracket 19 and coupled to the heat transfer coil bracket 22. The heat transfer coil bracket 22 is provided at a position lower than the permanent magnet bracket 34 in the transport carriage 10 on the transport module 11, that is, a position not in contact with the permanent magnet bracket 34. The two carriage drive coil brackets 19 are installed on the heat transfer coil bracket 22 so as to face each other inside the two transport module casings 15 facing each other. The carriage drive coils 13 are installed on the faces of the two carriage drive coil brackets 19 facing each other, respectively, so as to be spaced from each other. The spacing between the carriage drive coils 13 has a width through which the permanent magnet bracket 34 on which the permanent magnet 33 is installed can pass.

The carriage drive coil bracket 19 on which the carriage drive coil 13 is directly installed and the heat transfer coil bracket 22 coupled to the carriage drive coil bracket 19 function as heat transfer members to which the heat generated by the heat generation of the carriage drive coil 13 is transferred, respectively.

Both the ends of the heat transfer coil bracket 22 on the two transport module casings 15 side penetrate through holes 21 provided in the two transport module casings 15, respectively, and protrude to the outer wall side portions of the transport module casings 15 in the outside of the two transport module casings 15. As described below, heat radiation members 17 supported by the heat insulation members 20 on the pedestal 02 are installed and coupled to both the protruding ends of the heat transfer coil bracket 22. Each heat radiation member 17 and heat insulation member 20 may be integrally formed.

As described above, in the present embodiment, the heat radiation member 17 that radiates the heat generated in the carriage drive coil 13 is coupled via the heat transfer coil bracket 22 to the outer wall side portion of the transport module casing 15 opposed to the carriage drive coil 13. Accordingly, it is possible to utilize a wider space in the outer wall side portion instead of the narrow space in the inner wall portion of the transport module casing 15 in which the carriage drive coil 13 is installed and secure a required space for the heat radiation member 17. If the similar space is provided in the inner wall portion of the transport module casing 15, this may cause an issue related to an increase in the size of the apparatus or an issue related to a reduction in the rigidity of the transport module casing 15. In the present embodiment, it is possible to avoid the issues described above and install the heat radiation member 17 that radiates the heat generated due to the heat generation of the carriage drive coil 13.

Heat insulation layers 23a are provided between a set of a carriage drive coil brackets 19 and the heat transfer coil bracket 22 and a pair of the transport module casings 15. Accordingly, a set of the carriage drive coil brackets 19 and the heat transfer coil bracket 22 and a pair of the transport module casings 15 are installed so as not to come into contact with each other.

Further, heat insulation layers 23b are similarly provided between the heat transfer coil bracket 22 and respective inner wall of the through holes 21. Accordingly, the heat transfer coil bracket 22 is installed so as not to come into contact with the inner wall of the through hole 21. That is, the heat transfer coil bracket 22 is installed so as not to come into contact with the transport module casing 15 inside the through hole 21.

Each of the heat insulation layers 23a and 23b is a layer having low thermal conductivity, for example, an air layer. The heat insulation layers 23a and 23b have a higher thermal resistance than the thermal resistance of the carriage drive coil bracket 19 and the heat transfer coil bracket 22, which are the heat transfer members. Thereby, the heat insulation layers 23a and 23b prevent or suppress heat transfer from the carriage drive coil bracket 19 and the heat transfer coil bracket 22 to the transport module casing 15.

The two guide rails 14 are installed on the top face of the transport module casing 15 in parallel along the X direction. The guide block 35 of the transport carriage 10 is guided to the guide rails 14. Accordingly, the transport carriage 10 is arranged on the transport module 11 so as to be movable along the X direction.

As described above, the encoder 12 and the guide rail 14 are installed on the transport module casing 15, respectively. Here, both the encoder 12 and the guide rail 14 are components that affect the positioning accuracy of the linear actuator. Further, the encoder 12 affects the stop position accuracy of the linear actuator. The guide rail 14 affects the traveling accuracy of the linear actuator.

The transport module casing 15 on which such an encoder 12 and the guide rail 14 are installed is not in contact with the heat transfer coil bracket 22 to which the heat generated in the carriage drive coil 13 is transferred and is thermally insulated from the heat transfer coil bracket 22 because of the heat insulation layers 23a and 23b. Therefore, the transport module casing 15 is configured such that temporal change due to influence of the thermal expansion or the like caused by the heat of the carriage drive coil 13 is reduced. Further, with the transport module casing 15 being formed of a member having a high rigidity, the temporal change of the transport module casing 15 can be further reduced. As described above, in the present embodiment, the temporal change of the transport module casing 15 on which the encoder 12 and the guide rail 14 that affect the accuracy are installed is reduced. Therefore, according to the present embodiment, the positioning accuracy of the transport carriage 10, which is a mover, can be improved, and thereby the performance of the linear actuator can be improved.

Further, according to the present embodiment, since the positioning accuracy of the transport carriage 10 can be improved and cooling of the carriage drive coil 13 can be performed with a smaller space, the size of the linear actuator can be reduced.

Further, during processing, the workpiece W on the transport carriage 10 is subjected to external force by a processing tool or the like (not illustrated) provided on the processing apparatus 9 or the like. The external force is transmitted to the transport carriage 10 via the workpiece W. The external force transmitted to the transport carriage 10 is further transmitted to the guide block 35 and the guide rail 14. The transport module casing 15 receives the external force transmitted to the guide rail 14. Therefore, the transport module casing 15 is required to have the rigidity enough to endure the external force received from the processing tool or the like.

Note that the shape of the through hole 21 provided on the transport module casing 15 is not particularly limited as long as the heat transfer coil bracket 22 can penetrate the through hole 21 and the end thereof can protrude outside the transport module casing 15, and various shapes may be used. It is preferable, however, that the size of the opening of the through hole 21 be set within the range that causes little change in the rigidity of the transport module casing 15.

The heat radiation member 17 is installed on each of both the ends of the heat transfer coil bracket 22 protruding through the through hole 21 to the outer wall side portions of the two transport module casings 15. The heat radiation members 17 radiate the heat generated by the heat generation of the carriage drive coils 13 and transferred to the carriage drive coil brackets 19 and the heat transfer coil bracket 22. Further, the heat radiation member 17 is also installed to work towards protecting the encoder 12 and the scale 32.

Each heat radiation member 17 has a connection portion 17a connected to the end of the heat transfer coil bracket 22 protruding to the outer wall side portion of the transport module casing 15 and a plate-like portion 17b supported by the connection portion 17a. The plate-like portion 17b has a plate-like shape along the XZ plane that covers the side portions of the transport module 11 and the transport carriage 10 on the pedestal 02. The plate-like portion 17b covers the encoder 12 and the scale 32 provided on the transport module casing 15 from the outside so as to protect the encoder 12 and the scale 32. With the plate-like portion 17b, the heat radiation member 17 can ensure a high heat radiation effect and also function as a protection portion to protect the encoder 12 and the scale 32.

The plate-like portion 17b of the heat radiation member 17 may be a plate-like component as illustrated in FIG. 3 and FIG. 4 or may be a fin-shaped component in order to improve the heat radiation performance. Further, to improve the heat radiation performance, the heat radiation member 17 may be formed to have hollow structure to perform forced cooling by causing a cooling medium to flow into the hollow portion.

The heat insulation member 20 supporting the connection portion 17a is installed and coupled to the lower portion of the connection portion 17a of each heat radiation member 17. The heat insulation member 20 is installed on the pedestal 02 for heat insulation between the connection portion 17a and the pedestal 02. The heat radiation member 17 and the heat transfer coil bracket 22 connected to the heat radiation member 17 are installed on the pedestal 02 via the heat insulation member 20.

Figure 5:
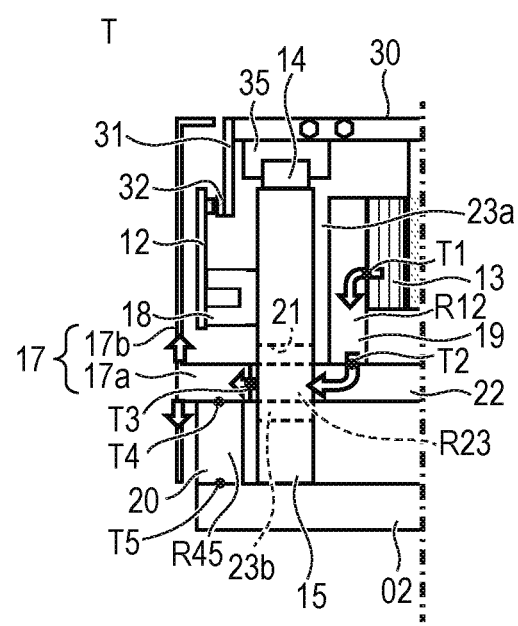
FIG. 5 is a schematic diagram illustrating heat transfer in the transport module according to one embodiment of the present disclosure.

The heat transfer in the transport module 11 according to the present embodiment will be now described with reference to FIG. 5. FIG. 5 is a schematic diagram illustrating the heat transfer in the transport module 11 according to the present embodiment. In FIG. 5, heat flow is indicated by arrows.

The heat generated due to the heat generation of the carriage drive coil 13 is transferred to the carriage drive coil bracket 19 and transferred to the heat transfer coil bracket 22. While it is desirable to use a material such as aluminum having high thermal conductivity for the heat transfer coil bracket 22, it is not necessarily required to select a material having high thermal conductivity. The reason will be described below.

The heat transferred to the heat transfer coil bracket 22 is transferred to the heat radiation member 17 and radiated into the atmosphere. Here, the temperature of a boundary portion between the carriage drive coil 13 and the carriage drive coil bracket 19 is denoted as T1 (degrees Celsius), and the temperature of a boundary portion between the carriage drive coil bracket 19 and the heat transfer coil bracket 22 is denoted as T2 (degrees Celsius). Further, the temperature of a boundary portion between the heat transfer coil bracket 22 and the heat radiation member 17 is denoted as T3 (degrees Celsius), and the temperature of a boundary portion between the heat radiation member 17 and the heat insulation member 20 is denoted as T4 (degrees Celsius). Further, the temperature of the pedestal 02 is denoted as T5 (degrees Celsius), and the environmental temperature around the transport module 11 is denoted as T (degrees Celsius). The thermal resistance of the carriage drive coil bracket 19 is denoted as R12 (degrees Celsius/W), the thermal resistance of the heat transfer coil bracket 22 is denoted as R23 (degrees Celsius/W), and the thermal resistance of the heat insulation member 20 is denoted as R45 (degrees Celsius/W). Further, the amount of heat generation of the carriage drive coil 13 is denoted as W (W).

It is assumed that, due to operation of the apparatus, the carriage drive coil 13 generates heat, and the total amount of heat generation W is transferred from the carriage drive coil 13 to the heat transfer coil bracket 22 via the carriage drive coil bracket 19. In such a case, a relationship expressed by Equation (1) below is established between the temperature T1 and the temperature T2.

$$T2=T1-R12 \times W \qquad \text{Equation (1)}$$

That is, the temperature decreases by the amount obtained by multiplying the thermal resistance R12 of the carriage drive coil bracket 19 and the amount of heat transfer W (=the amount of heat generation W of the carriage drive coil 13). Similarly, a relationship expressed by Equation (2) below is established between the temperature T2 and the temperature T3.

$$T3=T2-R23 \times W \qquad \text{Equation (2)}$$

According to Equation (1) and Equation (2), a relationship expressed by Equation (3) below is established between the temperature T1 and the temperature T3.

$$T3=T1-(R12+R23) \times W \qquad \text{Equation (3)}$$

That is, the temperature decreases by the amount obtained by multiplying the thermal resistance (R12+R23) that is the sum of the thermal resistance R12 of the carriage drive coil bracket 19 and the thermal resistance R23 of the heat transfer coil bracket 22 and the amount of heat transfer W (=the amount of heat generation W of the carriage drive coil 13).

Further, the mean temperature of the heat radiation member 17 is denoted as (T3+T4)/2, the heat radiation area of the heat radiation member 17 with respect to the cooling medium such as the atmosphere is denoted as A (m²), and the heat radiation coefficient per unit area is denoted as H (W/m²×degrees Celsius). Accordingly, the amount of heat radiation We (W) of the heat radiation member 17 can be obtained by Equation (4) below.

$$W_c = H \times A \times [\{(T3+T4)/2\}-T] \qquad \text{Equation (4)}$$

Here, to radiate the overall amount of heat generation W of the carriage drive coil 13 in the heat radiation member 17, Equation (5) may be established.

$$W = W_c = H \times A \times [\{(T3+T4)/2\}-T] \qquad \text{Equation (5)}$$

That is, to radiate the overall amount of heat generation W in the heat radiation member 17, the heat radiation coefficient H per unit area may be increased, a heat radiation area A may be increased, or the difference between the mean temperature (T3+T4)/2 of the heat radiation member 17 and the environmental temperature T may be increased.

In the cases of natural convection with the air, forced convection with the air, and cooling water, the heat radiation coefficient H is generally the highest in the case of cooling water, the second highest in the case of forced convection with the air, and the lowest in the case of natural convection with the air. To obtain a higher heat radiation coefficient H, a cooling system that causes a higher heat radiation coefficient H may be selected. However, the cost required for cooling is typically the lowest in the case of natural convection with the air, the second lowest in the case of forced convection with the air, and the highest in the case of cooling water.

Further, to increase the heat radiation area A, it is preferable to install the heat radiation member 17 that is as large as possible. When considering an issue such as a space or the like, however, the heat radiation member 17 may have a fin shape, such as a heat sink or the like, to secure a large heat radiation area A in a space that is as small as possible. Accordingly, reduction in size of the space can be implemented.

Further, to increase the difference between the mean temperature (T3+T4)/2 of the heat radiation member 17 and the environmental temperature T, the thermal resistance (R12+R23) obtained by adding the thermal resistance R12 of the carriage drive coil bracket 19 and the thermal resistance R23 of the heat transfer coil bracket 22 may be reduced in accordance with to Equation (3). In other words, when a cooling system that is as inexpensive as possible having a low heat radiation coefficient H is employed, or when the heat radiation member 17 that is as small as possible having a small heat radiation area A is employed, the thermal resistance R12 of the carriage drive coil bracket 19 and the thermal resistance R23 of the heat transfer coil bracket 22 may be reduced.

On the other hand, when the amount of heat generation W of the carriage drive coil 13 and the amount of heat radiation $W_c$ of the heat radiation member 17 are equal, all amount of heat transfer W of the carriage drive coil 13 is radiated by the heat radiation member 17, and T4=T is obtained. However, when all amount of heat transfer W of the carriage drive coil 13 is not fully radiated by the heat radiation member 17, a relationship expressed by Equation (6) below is established.

$$T5=T4-R45\times(W-W_c) \quad \text{Equation (6)}$$

Typically, the larger the thermal resistance R45 of the heat insulation member 20 is, the higher the thermal resistance performance of the heat insulation member 20 is. On the other hand, with the heat radiation member 17 being set so as to be capable of radiating the majority of the amount of heat generation W of the carriage drive coil 13, the amount of heat transferred to the heat insulation member 20 is reduced to the minimum. That is, it is not necessary to select an expensive material having low thermal conductivity as the material of the heat insulation member 20, and an additional heat insulation effect due to the heat insulation member 20 can be expected if a material having low thermal conductivity is selected as the material of the heat insulation member 20.

Further, compared to each component forming the transport module 11, the pedestal 02 has a significantly large heat capacity. Therefore, since the temperature T5 of the pedestal 02 does not significantly increase due to the heat amount passing through the heat insulation member 20, T5 is nearly equal to T. If the temperature T5 of the pedestal 02 does not increase in such a way, the heat of the carriage drive coil 13 is not transferred to the transport module casing 15, and thereby the temperature of the transport module casing 15 can be maintained at a constant level regardless of the temperature of the carriage drive coil 13. Accordingly, the thermal expansion of the transport module casing 15 due to heat generation of the carriage drive coil 13 can be prevented or reduced.

As described above, in the transport module 11 according to the present embodiment, the heat radiation member 17 is provided on the transfer path of the amount of heat generation W of the carriage drive coil 13. Therefore, transfer of the heat of the carriage drive coil 13 to the transport module casing 15 does not depend on the magnitude of the thermal resistance value of the heat transfer member or the heat insulation member. Therefore, according to the present embodiment, it is not necessary to select an expensive heat insulation material or heat transfer material as the material of the member forming the transport module 11, and it is also possible to reduce the sizes of the heat transfer member and the heat insulation member.

Note that configurations below can be employed to improve the heat radiation performance of the transport module 11.

The heat radiation member 17 may be a fin-shaped component or a component having hollow structure as described above, for example. Further, in a case of the heat radiation member 17 having the hollow structure, it is possible to cause a medium for cooling to flow inside the hollow structure. The medium for cooling is a cooling fluid such as cooling water or the like that cools the heat transfer member. Accordingly, the heat radiation performance of the heat radiation member 17 can be improved.

Further, the heat transfer member such as the carriage drive coil bracket 19, the heat transfer coil bracket 22, or the like may be a fin-shaped component or a component having hollow structure. Furthermore, in a case of the heat transfer member such as the carriage drive coil bracket 19, the heat transfer coil bracket 22, or the like having the hollow structure, it is possible to cause a medium for cooling to flow inside the hollow structure. The medium for cooling is a cooling fluid such as cooling water or the like that cools the heat transfer member. Accordingly, the heat transfer member such as the carriage drive coil bracket 19, the heat transfer coil bracket 22, or the like can also be configured to function as a heat radiation member for radiating heat.

Furthermore, the heat insulation member 20 may be a fin-shaped component or a component having hollow structure, for example. Furthermore, in a case of the heat insulation member 20 having the hollow structure, it is possible to cause a medium for cooling to flow inside the hollow structure. The medium for cooling is a cooling fluid such as cooling water or the like that cools the heat insulation member 20, for example. Accordingly, the heat insulation member 20 can also be configured to function as a heat radiation member 17 for radiating heat.

Figure 6:
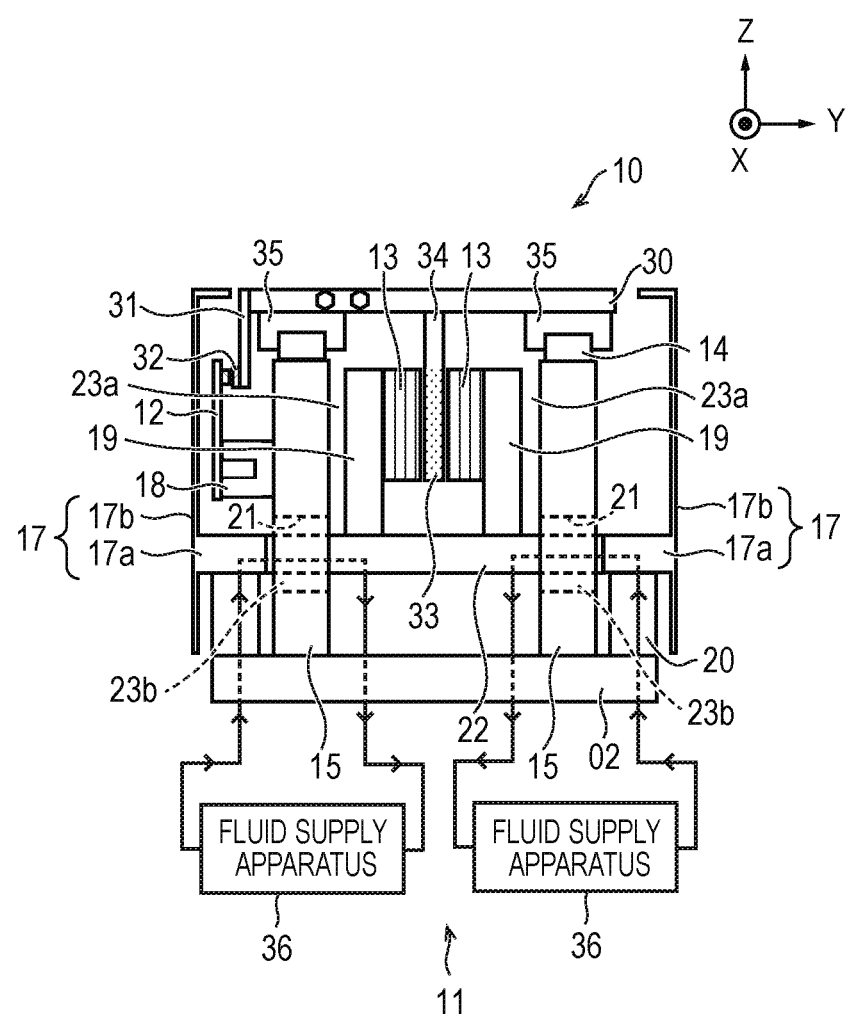
FIG. 6 is a sectional view illustrating a modified example of the configuration of the transport carriage and the transport module in the transport system according to one embodiment of the present disclosure.

FIG. 6 illustrates an example configured to cause a cooling fluid to flow thought the heat insulation member 20, the heat radiation member 17, and the heat transfer coil bracket 22, which is a heat transfer member, each of which has hollow structure. As illustrated, fluid supply apparatuses 36 that supply and cause a cooling fluid to flow inside the heat insulation member 20, the heat radiation member 17, and the heat transfer coil bracket 22 are installed to the transport module 11.

Each fluid supply apparatus 36 is formed of a chiller or the like, for example. As illustrated by lines including arrows in FIG. 6, the fluid supply apparatus 36 causes a cooling fluid to flow in the internal portion of the heat insulation member 20 from the pedestal 02 side and flow through each internal portion of the heat insulation member 20, the heat radiation member 17, and the heat transfer coil bracket 22 in this order. Further, the fluid supply apparatus 36 causes the cooling fluid to flow out from the heat transfer coil bracket 22 side. In such a way, by the cooling fluid circulating through each internal portion of the heat insulation member 20, the heat radiation member 17, and the heat transfer coil bracket 22 in this order, the fluid supply apparatus 36 cools the heat insulation member 20, the heat radiation member 17, and the heat transfer coil bracket 22.

Note that the fluid supply apparatus 36 may cause the cooling fluid not only to flow through all the internal portions of the heat insulation member 20, the heat radiation member 17, and the heat transfer coil bracket 22 but also to flow through the internal portions of some of these components. The fluid supply apparatus 36 can cause the cooling fluid not to flow through the internal portion of the heat transfer coil bracket 22 but to flow through each internal portion of the heat radiation member 17 and the heat transfer coil bracket 22, for example. Further, the fluid supply apparatus 36 can cause the cooling fluid not to flow through each internal portion of the heat radiation member 17 and the heat transfer coil bracket 22 but to flow through the internal portion of the heat transfer coil bracket 22, for example.

Further, when the hollow structure is employed as described above, at least some of the heat radiation member 17, the carriage drive coil bracket 19, the heat transfer coil bracket 22 and the heat insulation member 20 may have the hollow structure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-161316, filed Sep. 4, 2019, which is hereby incorporated by reference herein in its entirety.

What is claimed is:

1. A linear actuator comprising:
    a guide rail along which a mover having a permanent magnet is movable;
    a wall portion supporting the guide rail;
    a pedestal to which the wall portion is installed;
    a heat insulation member installed on the pedestal;
    a heat radiation member to which the heat insulation member is coupled;
    a heat transfer member coupled to the heat radiation member at an end; and
    a coil coupled to the heat transfer member,
    wherein the shortest heat transfer path of the coil and the guide rail is formed via the heat transfer member, the heat radiation member, the heat insulation member, the pedestal, and the wall portion.

2. The linear actuator according to claim 1, the linear actuator further comprising a heat insulation layer provided between the heat transfer member and the wall portion,
    wherein a through hole is provided in the wall portion,
    wherein the heat transfer member includes a first heat transfer member penetrating the through hole and having an end protruding outside the wall portion, and
    wherein the heat insulation layer has a first heat insulation layer provided between an inner wall of the through hole and the first heat transfer member.

3. The linear actuator according to claim 2, wherein the heat radiation member is coupled to the end of the first heat transfer member.

4. The linear actuator according to claim 2,
    wherein the heat transfer member includes a second heat transfer member to which the coil is installed, and
    wherein the heat insulation layer includes a second heat insulation layer provided between the second heat transfer member and the wall portion.

5. The linear actuator according to claim 2, wherein the heat insulation layer is an air layer.

6. The linear actuator according to claim 1, wherein the heat radiation member has a plate-like portion.

7. The linear actuator according to claim 6, further comprising a position detection unit provided on the wall portion and configured to detect a position of the mover,
    wherein the plate-like portion covers the position detection unit.

8. The linear actuator according to claim 1, wherein the wall portion includes two wall portions facing each other.

9. The linear actuator according to claim 1, wherein at least any of the heat radiation member, the heat insulation member, or the heat transfer member has hollow structure.

10. The linear actuator according to claim 9, the linear actuator further comprising a fluid supply apparatus configured to cause a cooling fluid to flow through the heat transfer member, wherein the heat transfer member has the hollow structure.

11. The linear actuator according to claim 9, the linear actuator further comprising a fluid supply apparatus configured to cause a cooling fluid to flow through the heat radiation member and the heat insulation member, wherein the heat radiation member and the heat insulation member have the hollow structure.

12. The linear actuator according to claim 11, wherein the fluid supply apparatus causes the cooling fluid to flow in the heat radiation member and the heat insulation member from a side of the pedestal and flow out from a side of the heat transfer member.

13. The linear actuator according to claim 1, wherein the heat radiation member and the heat insulation member are integrally formed.

14. A processing system comprising:
a linear actuator including:
- a guide rail along which a mover having a permanent magnet is movable;
- a wall portion supporting the guide rail;
- a pedestal to which the wall portion is installed;
- a heat insulation member installed on the pedestal;
- a heat radiation member to which the heat insulation member is coupled;
- a heat transfer member coupled to the heat radiation member at an end; and
- a coil coupled to the heat transfer member,
- wherein the shortest heat transfer path of the coil and the guide rail is formed via the heat transfer member, the heat radiation member, the heat insulation member, the pedestal, and the wall portion; and
- a processing apparatus configured to process a workpiece transported by the mover.

15. A manufacturing method of an article for manufacturing an article by using a linear actuator including:
- a guide rail along which a mover having a permanent magnet is movable;
- a wall portion supporting the guide rail;
- a pedestal to which the wall portion is installed;
- a heat insulation member installed on the pedestal;
- a heat radiation member to which the heat insulation member is coupled;
- a heat transfer member coupled to the heat radiation member at an end; and
- a coil coupled to the heat transfer member,
- wherein the shortest heat transfer path of the coil and the guide rail is formed via the heat transfer member, the heat radiation member, the heat insulation member, the pedestal, and the wall portion, the manufacturing method comprising:
transporting a workpiece by the mover; and
manufacturing an article by processing the workpiece.

\* \* \* \* \*